(12) United States Patent
Hsieh et al.

(10) Patent No.: US 6,561,210 B2
(45) Date of Patent: May 13, 2003

(54) VALVE FOR CONTROLLING FAUCET AND SPRAYER COMBINATION

(76) Inventors: Shih Kun Hsieh, No. 512, Liaw Tsu Lane, Liaw Tsu Li, Lu Gang Town, Chang Hua Hsien (TW), 505; Ming Chun Shieh, No. 16, Tou Ren Lane, Tou Ren Li, Lu Gang Town, Chang Hua Hsien (TW), 505

( * ) Notice: Subject to any disclaimer, the term of this patent is extended or adjusted under 35 U.S.C. 154(b) by 35 days.

(21) Appl. No.: 09/929,566

(22) Filed: Aug. 15, 2001

(65) Prior Publication Data

US 2003/0034068 A1 Feb. 20, 2003

(51) Int. Cl.7 ............................................... G05D 11/00
(52) U.S. Cl. .................... 137/119.04; 137/597
(58) Field of Search ................. 137/119.04, 119.03, 137/119.05, 597

(56) References Cited

U.S. PATENT DOCUMENTS

| 5,743,286 A | * | 4/1998 | Ko | 137/119.04 |
| 5,881,754 A | * | 3/1999 | Wei | 137/119.04 |
| 6,062,249 A | * | 5/2000 | Givlerr | 137/119.04 |

* cited by examiner

Primary Examiner—Stephen M. Hepperle
(74) Attorney, Agent, or Firm—Charles E. Baxley

(57) ABSTRACT

A faucet includes a space coupled to a sprayer device and water reservoirs, and a valve device received in the space of the faucet for controlling the water to flow out through either the faucet or the sprayer device. The valve device includes a housing secured in the space of the faucet, a valve stem slidably received in the housing, a plug secured on top of the valve stem, and another plug secured to the lower portion of the valve stem and having a flat upper surface for engaging with the lower peripheral portion of the housing and for solidly blocking the water.

16 Claims, 4 Drawing Sheets

VALVE FOR CONTROLLING FAUCET AND SPRAYER COMBINATION

BACKGROUND OF THE INVENTION

1. Field of the Invention

The present invention relates to a valve for a faucet and sprayer combination, and more particularly to a valve device for controlling or for switching between a faucet and a sprayer device of the faucet and sprayer combination.

2. Description of the Prior Art

Typical faucet and sprayer combinations comprise a faucet body coupled to a hot water reservoir and a cold water reservoir, a faucet and a sprayer device coupled to the faucet body, and a valve device disposed in the faucet body for controlling or switching between the faucet and the sprayer device, U.S. Pat. No. 5,881,754 to Wei discloses one of the typical faucet and sprayer combinations and comprises a valve stem including an upper plug and a lower plug for engaging with two valve seats respectively and for controlling the water to flow through the faucet and the sprayer device respectively. However, the lower plug may be forced to be solidly engaged with the faucet body and may be jammed when the cold water or the hot water from the water reservoirs is stopped suddenly or when the water pressure in the faucet body is dropped suddenly. The plugs are received in the inner portion of the faucet body and may not be easily repaired or fixed when the plugs are jammed. In addition, the spring member is directly engaged with the rubber plug and may damage the rubber plug after use.

The present invention has arisen to mitigate and/or obviate the afore-described disadvantages of the conventional valve devices for faucet and sprayer combinations.

SUMMARY OF THE INVENTION

The primary objective of the present invention is to provide a valve device for controlling or for switching between a faucet and a sprayer device and for preventing the plug from being jammed within the faucet and sprayer combination.

The other objective of the present invention is to provide a valve device including a spring member that will not be engaged with the rubber plug and that may be prevented to damage the rubber plug.

In accordance with one aspect of the invention, there is provided a valve facility for a faucet and sprayer combination comprising a body including a space formed therein and defined by an inner peripheral surface and having an upper portion and a lower portion, two pipes coupling the space of the body to water reservoirs, a faucet coupling to the upper portion of the space of the body, and a sprayer device coupling to the lower portion of the space of the body, and a valve device received in the space of the body for controlling the water to flow out through either the faucet or the sprayer device. The valve device comprises a housing secured in the space of the body and including a chamber formed therein, and including an upper portion having a valve seat provided thereon, and including a lower peripheral portion, a valve stem slidably received in the chamber of the housing, and including an upper portion, and including a lower portion, a first plug secured on the upper portion of the valve stem for engaging with the valve seat, a second plug secured to the lower portion of the valve stem for engaging with the lower peripheral portion of the housing, the second plug including a flat upper surface for engaging with the lower peripheral portion of the housing and for preventing water to flow out of the chamber of the housing, and including a lower portion having a peripheral recess formed therein for forming a resilient peripheral flap and for allowing the water to force the resilient peripheral flap inward of the peripheral recess of the second plug when the flat upper surface of the second plug is disengaged from the lower peripheral portion of the housing, and means for biasing the flat upper surface of the second plug to engage with the lower peripheral portion of the housing and to disengage the first plug away from the valve seat of the housing.

The housing includes a peripheral bulge extended downward from the lower peripheral portion of the housing for engaging with the flat upper surface of the second plug.

The housing includes at least one fin extended radially inward of the chamber of the housing, the biasing means includes a spring engaged between the fin of the housing and the valve stem for biasing the flat upper surface of the second plug to engage with the lower peripheral portion of the housing.

The fin includes a protrusion extended radially inward of the chamber of the housing for forming a shoulder in the fin and for solidly engaging with the spring.

The valve stem includes a peripheral swelling extended radially outward therefrom for solidly engaging with the spring.

The housing includes a cavity formed in the upper portion thereof, and includes at least one panel extended radially inward of the cavity of the housing, for engaging with the first plug and for guiding the first plug to move up and down relative to the housing.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
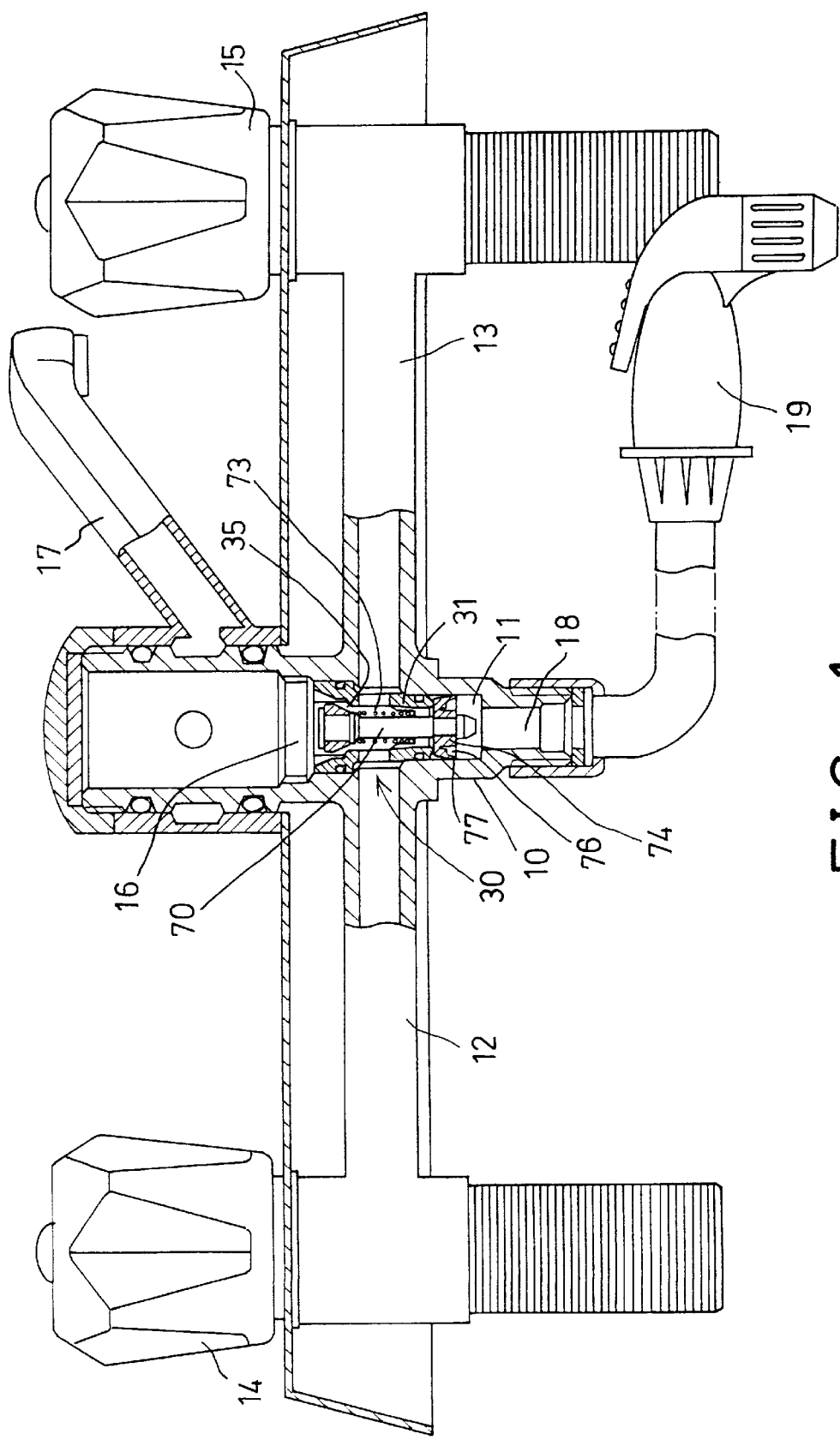
FIG. 1 is a partial cross sectional view of a valve device for a faucet and sprayer combination in accordance with the present invention.
Figure 4:
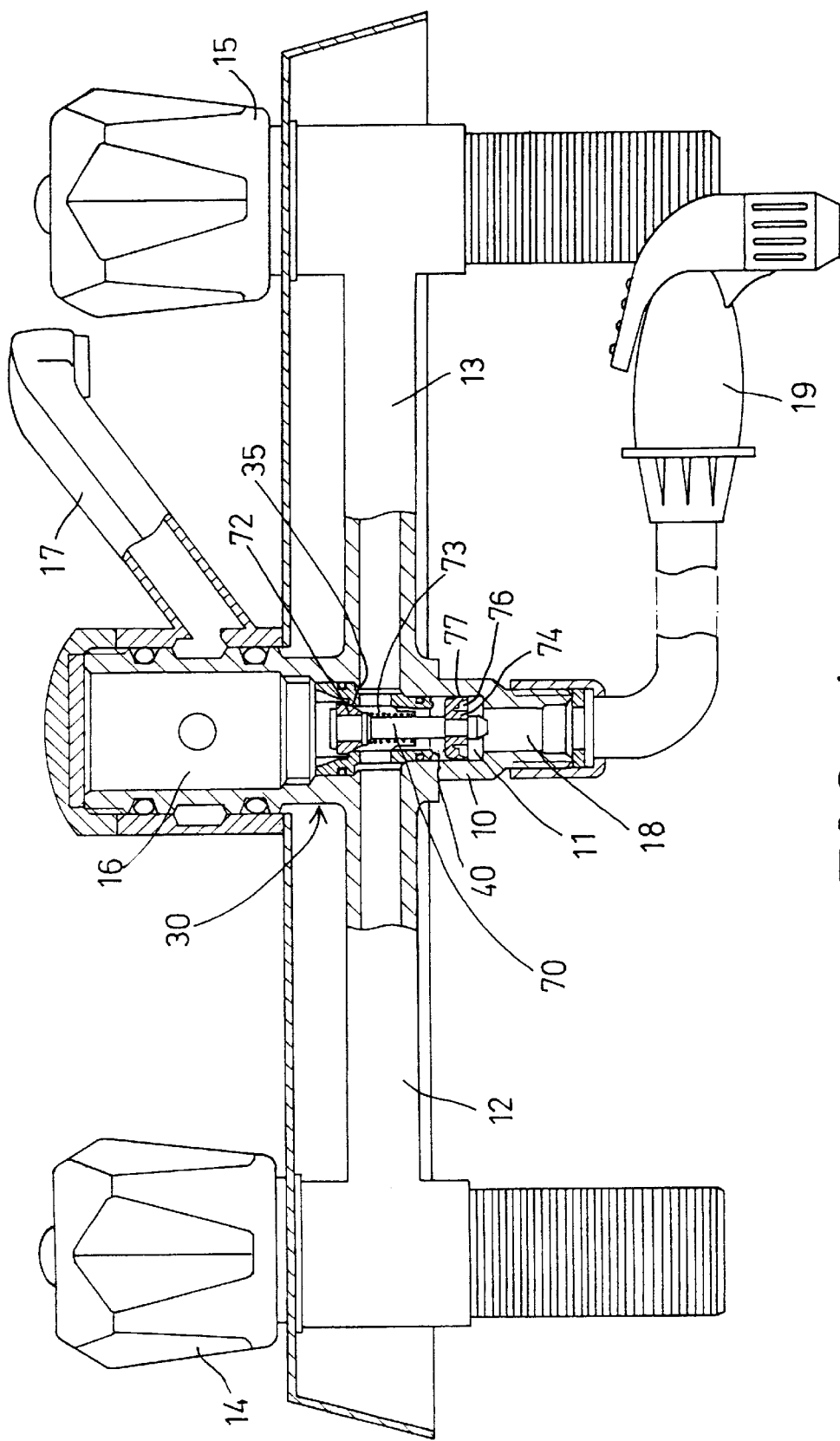
FIG. 4 is a partial cross sectional view similar to FIG. 1 illustrating the operation of the valve device for the faucet and sprayer combination.

Referring to the drawings, and initially to FIGS. 1 and 4, a valve device 30 in accordance with the present invention is provided for engaging in and for controlling or switching between a faucet 17 and a sprayer device 19 of a faucet and sprayer combination. The faucet and sprayer combination comprises a body 10 including a space 11 formed therein and defined by an inner peripheral surface and including two pipes 12, 13 communicating with the space 11 thereof and coupled to a cold water reservoir and a hot water reservoir, for example, via two control devices 14, 15 respectively which may control the cold water and/or the hot water to flow into the space 11 of the body 10. The body 10 includes an opening or a port 16 for coupling to the faucet 17, and another opening or port 18 for coupling to the sprayer device

19. The valve device 30 is provided for controlling or switching between the faucet 17 and the sprayer device 19 aid for a flowing the water to flow out through either the faucet 17 and the sprayer device 19.

Figure 2:
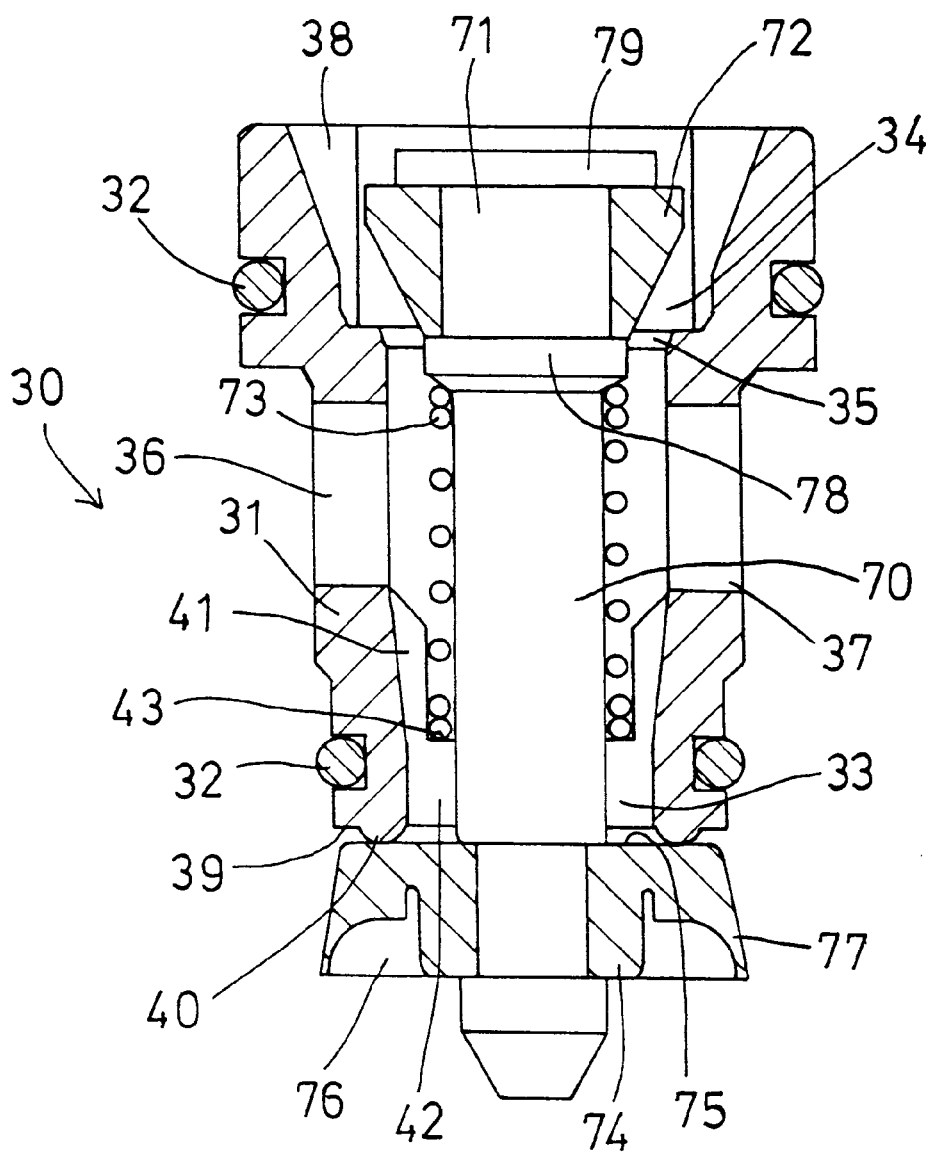
FIG. 2 is a cross sectional view of the valve device for the faucet and sprayer combination.
Figure 3:
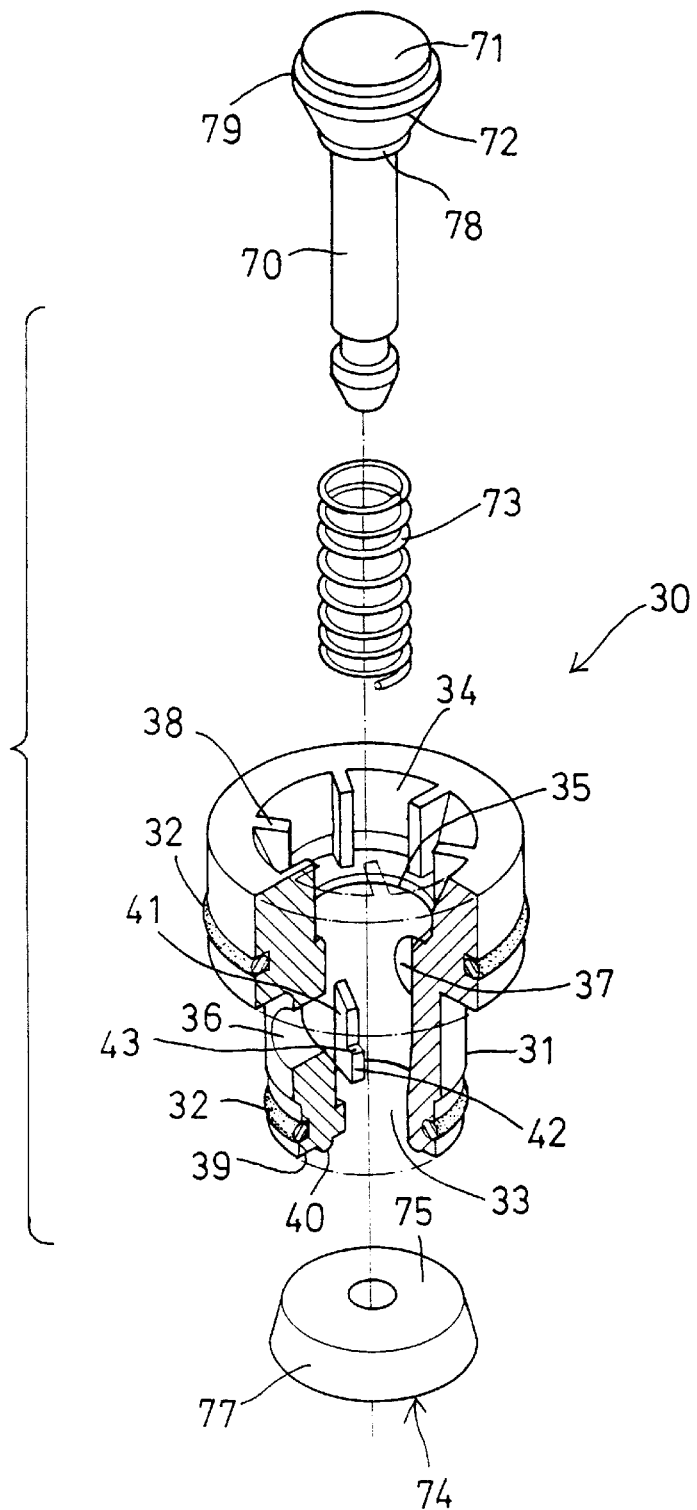
FIG. 3 is an exploded view of the valve device for the faucet and sprayer combination.

Referring next to FIGS. 2 and 3, and again to FIG. 1, the valve device 30 includes a housing 31 received or secured in the space 11 of the body 10 with such as a force-fitted engagement, and one or more sealing rings 32 engaged between the housing 31 and the body 10 for making a water tight seal between the housing 31 and the body 10. The housing 31 includes a lower chamber 33 and an upper cavity 34 which includes an inner diameter greater than that of the chamber 33, such that a inner peripheral shoulder or a valve seat 35 is formed between the chamber 33 and the upper cavity 34. The housing 31 includes two orifices 36, 37 formed therein, such as oppositely formed therein and communicating with the chamber 33 of the housing 31 and the pipes 12, 13 respectively, for allowing the cold water and/or the hot water from the pipes 12, 13 to flow into the chamber 33 and the cavity 34 of the housing 31.

The housing 31 includes one or more panels 38 extended radially inward of the upper cavity 34 thereof. The panels 38 include an inner diameter greater than the inner diameter of the chamber 33 and/or the valve seat 35 of the housing 31. The housing 31 includes a flat and annular bottom surface 39, and a curved and peripheral or annular bulge 40 extended downward from the bottom surface 39 of the housing 31. The housing 31 includes one or more fins 41 extended radially inward of the chamber 33 thereof. The fins 41 each includes a protrusion 42 further extended radially inward of the chamber 33 of the housing 31 for forming or defining a shoulder 43 therein or therebetween.

A valve stem 70 is slidably received in the chamber 33 and/or the cavity 34 of the housing 31, and includes an enlarged head 71 formed or provided on top thereof, and a gasket or a plug 72 secured therein. For example, the head 71 of the valve stem 70 includes two annular or peripheral swellings 78, 79 extended radially outward therefrom for engaging with and for retaining or for securing the plug 72 on the upper portion or on the head 71 of the valve stem 70. The plug 72 is preferably made of rubber materials for engaging with the valve seat 35 and for controlling the water to flow out through the faucet 17. A spring 73 is engaged with the shoulders 43 of the fins 41 and engaged with the peripheral swelling 78 of the valve stem 70, for biasing the plug 72 to move away or to be disengaged from the valve seat 35 of the housing 31. The spring 73 is not engaged with the plug 72, but engaged with the peripheral swelling 78, such that the spring 73 will not damage the plug 72. The panels 38 of the housing 31 may be engaged with the plug 72 for guiding the plug 72 to move up and down relative to the housing 31 and for preventing the plug 72 from moving laterally relative to the housing 31, and for allowing the water to flow bypass the plug 72.

Another plug 74 is secured to the bottom or the lower portion of the valve stem 70, and includes a flat upper surface 75 formed or provided thereon for engaging with the annular bulge 40 of the housing 31 and for blocking the water or for preventing the water from flowing out through the sprayer device 19. The plug 74 includes an annular or a peripheral recess 76 formed in the lower portion thereof for forming or defining an outwardly extended or dependent and resilient flap 77 and for resiliently engaging with the inner peripheral surface of body 10 (FIGS. 1, 4). As shown in FIG. 1, the spring 73 may bias and force, the plug 74 to engage with the annular bulge 40 of the housing 31 and thus to block the water and to prevent the water from flowing out through the sprayer device 19.

In operation, as shown in FIG. 1, the flat upper surface 75 of the plug 74 may be biased or forced, by the spring 73, to engage with the annular bulge 40 of the housing 31 and thus to block the water and to prevent the water from flowing out through the sprayer device 19. At this moment, the plug 72 is disengaged from the valve seat 35 of the housing 31, such that the water from the pipes 12, 13 may be controlled to flow out through the faucet 17 by the control devices 14, 15. At this moment, the sprayer device 19 has not been operated or actuated.

As shown in FIG. 4, when the sprayer device 19 is operated or actuated, the pressure in the sprayer device 19 is released, and the water flowing into the housing 31, from the pipes 12, 13 may force and move the plug 74 away from the annular bulge 40 of the housing 31 against the spring 73. In addition, the water may force the resilient peripheral flap 77 inward of the peripheral recess 76 of the plug 74 and may force the flap 77 away from the body 10, such that the water may flow out through the sprayer device 19 at this moment.

It is to be noted that the flat upper surface 75 of the plug 74 may be biased to solidly engage with the annular bulge 40 of the housing 31 and may thus be prevented from being engaged into the chamber 33, of the housing 31 and may be prevented from being jammed within the housing 31. In addition, the spring 73 is not engaged with the plugs 72, 74, and is engaged with or engaged between the shoulders 43 of the fins 41 and the peripheral swelling 78 of the valve stem 70, such that the spring 73 will not damage the plugs 72, 74.

Accordingly, the valve device in accordance with the present invention may be used for controlling or for switching between a faucet and a sprayer device and for preventing the plug from being jammed within the faucet and sprayer combination. The spring member of the valve device will not be engaged with the rubber plug and may be prevented to damage the rubber plug.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A valve device comprising:
    a housing including a chamber formed therein, and including an upper portion having a valve seat provided thereon, and including a lower peripheral portion, said housing including at least one fin extended radially inward of said chamber of said housing,
    a valve stem slidably received in said chamber of said housing, and including an upper portion, and including a lower portion,
    a first plug secured on said upper portion of said valve stem for engaging with said valve seat,
    a second plug secured to said lower portion of said valve stem for engaging with said lower peripheral portion of said housing, said second plug including a flat upper surface for engaging with said lower peripheral portion of said housing and for preventing water to flow out of said chamber of said housing, and including a lower portion having a peripheral recess formed therein for forming a resilient peripheral flap and for allowing the water to force said resilient peripheral flap inward of said peripheral recess of said second plug when said flat upper surface of said second plug is disengaged from said lower peripheral portion of said housing, and means for biasing said flat upper surface of said second plug to engage with said lower peripheral portion of said housing and to disengage said first plug away from said valve seat of said housing, and said biasing means including a spring engaged between said at least one fin of said housing and said valve stem for biasing said flat upper surface of said second plug to engage with said lower peripheral portion of said housing.

2. The valve device according to claim 1, wherein said housing includes a peripheral bulge extended downward from said lower peripheral portion of said housing for engaging with said flat upper surface of said second plug.

3. The valve device according to claim 1, wherein said at least one fin includes a protrusion extended radially inward of said chamber of said housing for forming a shoulder in said at least one fin and for solidly engaging with said spring.

4. The valve device according to claim 3, wherein said valve stem includes a peripheral swelling extended radially outward therefrom for solidly engaging with said spring.

5. The valve device according to claim 1, wherein said housing includes a cavity formed in said upper portion thereof, and includes at least one panel extended radially inward of said cavity of said housing for engaging with said first plug and for guiding said first plug to move up and down relative to said housing.

6. A valve device comprising:
   a housing including a chamber formed therein, and including an upper portion having a valve seat provided thereon, and including a lower peripheral portion, said housing including at least one fin extended radially inward of said chamber of said housing,
   a valve stem slidably received in said chamber of said housing, and including an upper portion and a lower portion, and including a peripheral swelling extendedradially outward from said upper portion thereof,
   a first plug secured on said upper portion of said valve stem for engaging with said valve seat,
   a second plug secured to said lower portion of said valve stem for engaging with said lower peripheral portion of said housing, and
   a spring engaged between said at least one fin of said housing and said peripheral swelling of said valve stem for biasing said second plug to engage with said lower peripheral portion of said housing, and for disengaging said first plug away from said valve seat of said housing.

7. The valve device according to claim 6, wherein said second plug includes a flat upper surface for engaging with said lower peripheral portion of said housing and for preventing water to flow out of said chamber of said housing, and said second plug includes a lower portion having a peripheral recess formed therein for forming a resilient peripheral flap and for allowing the water to force said resilient peripheral flap inward of said peripheral recess of said second plug when said flat upper surface of said second plug is disengaged from said lower peripheral portion of said housing.

8. The valve device according to claim 7, wherein said housing includes a peripheral bulge extended downward from said lower peripheral portion of said housing for engaging with said flat upper surface of said second plug.

9. The valve device according to claim 6, wherein said at least one fin includes a protrusion extended radially inward of said chamber of said housing for forming a shoulder in said at least one fin and for solidly engaging with said spring.

10. The valve device according to claim 6, wherein said housing includes a cavity formed in said upper portion thereof, and includes at least one panel extended radially inward of said cavity of said housing for engaging with said first plug and for guiding said first plug to move up and down relative to said housing.

11. A faucet and sprayer combination comprising:
   a) a body including a space formed therein and defined by an inner peripheral surface and having an upper portion and a lower portion, two pipes coupling said space of said body to water reservoirs, a faucet coupling to said upper portion of said space of said body, and a sprayer device coupling to said lower portion of said space of said body, and
   b) a valve device received in said space of said body for controlling the water to flow out through either said faucet or said sprayer device, said valve device comprising:
      i) a housing secured in said space of said body and including a chamber formed therein, and including an upper portion having a valve seat provided thereon, and including a lower peripheral portion,
      ii) a valve stem slidably received in said chamber of said housing, and including an upper portion, and including a lower portion,
      iii) a first plug secured on said upper portion of said valve stem for engaging with said valve seat,
      iv) a second plug secured to said lower portion of said valve stem for engaging with said lower peripheral portion of said housing, said second plug including a flat upper surface for engaging with said lower peripheral portion of said housing and for preventing water to flow out of said chamber of said housing, and including a lower portion having a peripheral recess formed therein for forming a resilient peripheral flap and for engaging with said inner peripheral surface of said body, said resilient peripheral flap being allowed to be forced inward of said peripheral recess of said second plug by the water when said flat upper surface of said second plug is disengaged from said lower peripheral portion of said housing, and
      v) means for biasing said flat upper surface of said second plug to engage with said lower peripheral portion of said housing and to disengage said first plug away from said valve seat of said housing.

12. The valve device according to claim 11, wherein said housing includes a peripheral bulge extended downward from said lower peripheral portion of said housing for engaging with said flat upper surface of said second plug.

13. The valve device according to claim 11, wherein said housing includes at least one fin extended radially inward of said chamber of said housing, said biasing means includes a spring engaged between said at least one fin of said housing and said valve stem for biasing said flat upper surface of said second plug to engage with said lower peripheral portion of said housing.

14. The valve device according to claim 13, wherein said at least one fin includes a protrusion extended radially inward of said chamber of said housing for forming a shoulder in said at least one fin and for solidly engaging with said spring.

15. The valve device according to claim 13, wherein said valve stem includes a peripheral swelling extended radially outward therefrom for solidly engaging with said spring.

16. The valve device according to claim 11, wherein said housing includes a cavity formed in said upper portion thereof, and includes at least one panel extended radially inward of said cavity of said housing for engaging with said first plug and for guiding said first plug to move up and down relative to said housing.

* * * * *